United States Patent
Pittelli

(10) Patent No.: US 9,517,611 B2
(45) Date of Patent: Dec. 13, 2016

(54) MULTI-LAYER LOW TEMPERATURE SHRINK FILM

(75) Inventor: Gabriel Pittelli, Kimberly, WI (US)

(73) Assignee: COVERIS FLEXIBLES US LLC, Chicago, IL (US)

( * ) Notice: Subject to any disclaimer, the term of this patent is extended or adjusted under 35 U.S.C. 154(b) by 0 days.

(21) Appl. No.: 13/036,974

(22) Filed: Feb. 28, 2011

(65) Prior Publication Data

US 2012/0052270 A1    Mar. 1, 2012

Related U.S. Application Data

(60) Provisional application No. 61/308,523, filed on Feb. 26, 2010.

(51) Int. Cl.
*B32B 7/02* (2006.01)
*B32B 27/32* (2006.01)
*B32B 27/30* (2006.01)

(52) U.S. Cl.
CPC ........... *B32B 27/327* (2013.01); *B32B 27/302* (2013.01); *B32B 27/304* (2013.01); *B32B 27/306* (2013.01); *B32B 2250/05* (2013.01); *B32B 2250/246* (2013.01); *B32B 2307/7242* (2013.01); *B32B 2307/7244* (2013.01); *B32B 2307/736* (2013.01); *Y10T 428/2495* (2015.01); *Y10T 428/24992* (2015.01); *Y10T 428/31924* (2015.04)

(58) Field of Classification Search
CPC .. B32B 7/02; B32B 2250/05; B32B 2250/246; B32B 2307/7242; B32B 2307/7244; B32B 2307/736; B32B 27/302; B32B 27/304; B32B 27/327; Y10T 428/2495; Y10T 428/24992; Y10T 428/31924
USPC ....................... 428/212, 220, 411.1
See application file for complete search history.

(56) References Cited

U.S. PATENT DOCUMENTS

| | | |
|---|---|---|
| 5,106,677 A | 4/1992 | Yeh et al. |
| 5,158,836 A | 10/1992 | Schirmer et al. |
| 5,273,797 A | 12/1993 | Hazelton et al. |
| 5,466,499 A | 11/1995 | Takagi et al. |
| 5,482,769 A | 1/1996 | Schirmer |
| 5,523,136 A | 6/1996 | Fischer et al. |
| 5,529,833 A | 6/1996 | Speer et al. |
| 5,616,420 A | 4/1997 | Yamaoka et al. |
| 5,663,002 A | 9/1997 | Schirmer |
| 5,783,270 A | 7/1998 | Fischer et al. |
| 5,972,519 A | 10/1999 | Niessner et al. |
| 6,017,623 A | 1/2000 | Nakanishi |
| 6,060,136 A | 5/2000 | Patrick et al. |
| 6,248,850 B1 | 6/2001 | Arai |
| 6,376,095 B1 | 4/2002 | Cheung et al. |
| 6,406,763 B1 * | 6/2002 | Wolf et al. ............... 428/34.9 |
| 6,455,161 B1 | 9/2002 | Regnier et al. |
| 6,479,138 B1 | 11/2002 | Childress |
| 6,489,016 B2 | 12/2002 | Kishine |
| 6,517,936 B1 | 2/2003 | Ciocca et al. |
| 6,517,950 B1 | 2/2003 | Patrick et al. |
| 6,635,343 B2 | 10/2003 | Inoue et al. |
| 6,884,480 B2 | 4/2005 | Bradfute et al. |
| 6,897,260 B2 | 5/2005 | Vynckier |
| 6,902,795 B1 | 6/2005 | Ishii et al. |
| 7,083,838 B2 | 8/2006 | Pettis |
| 7,192,636 B2 | 3/2007 | Taghavi |
| 7,196,023 B2 | 3/2007 | Langley et al. |
| 7,338,708 B2 | 3/2008 | Wilburn et al. |
| 7,341,793 B2 | 3/2008 | Ishii et al. |
| 7,351,767 B2 | 4/2008 | Hartsock et al. |
| 7,365,130 B2 | 4/2008 | Rivett et al. |
| 7,470,747 B2 | 12/2008 | Kuro Kawa et al. |
| 7,473,473 B2 | 1/2009 | Verrocchi |
| 7,537,829 B2 | 5/2009 | Pellingra, Jr. et al. |
| 7,582,341 B2 | 9/2009 | Pettis |
| 7,638,188 B2 | 12/2009 | Ishihara et al. |
| 2005/0235611 A1 | 10/2005 | Roussos |
| 2007/0212550 A1 | 9/2007 | ReFraschini et al. |
| 2008/0286507 A1 | 11/2008 | Smithson et al. |

* cited by examiner

*Primary Examiner* — Bijan Ahvazi
*Assistant Examiner* — Lawrence Ferguson
(74) *Attorney, Agent, or Firm* — Stoel Rives LLP

(57) ABSTRACT

A multi-layer low temperature heat shrink film comprising an abuse layer comprising styrene-butadiene block copolymer; a first tie layer comprising ethylene vinyl acetate; a gas barrier layer comprising polyvinylidene chloride; a second tie layer comprising ethylene vinyl acetate; and a sealant layer comprising a metallocene-catalyzed sealant, is disclosed.

9 Claims, 1 Drawing Sheet

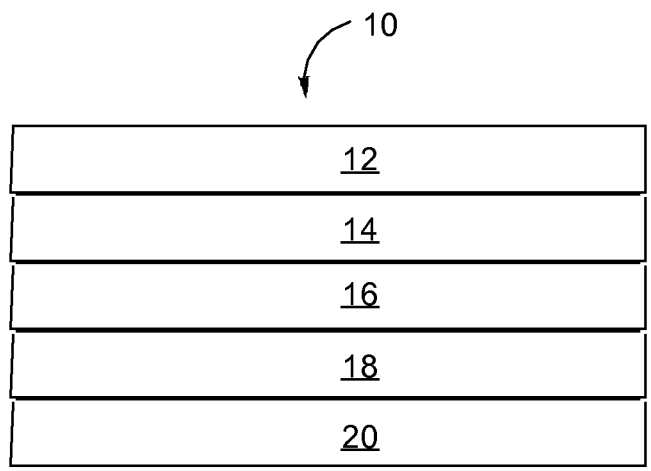

MULTI-LAYER LOW TEMPERATURE SHRINK FILM

RELATED APPLICATIONS

This application claims priority to U.S. Provisional Patent Application Ser. No. 61/308,523, filed on Feb. 26, 2010, entitled "MULTI-LAYER LOW TEMPERATURE SHRINK FILM", the disclosure of which is incorporated entirely herein by reference.

TECHNICAL FIELD

The invention relates to a multi-layer low temperature shrink film, in particular, the invention relates to a multi-layer low temperature shrink film having a styrene-butadiene block copolymer abuse layer and a metallocene linear low density polyethylene or ultra low density polyethylene sealant layer.

BRIEF DESCRIPTION OF THE DRAWINGS

The FIGURE shows a five layer film in accordance with aspects of the present disclosure.

DETAILED DESCRIPTION

Low temperature heat shrink films are desirable for various packaging applications. It is difficult to obtain low temperature heat shrink films that have good printability, clarity, and gloss characteristics. The present disclosure relates to a low temperature heat shrink film having at least five layers, comprising an abuse layer comprising styrene-butadiene block copolymer, a first tie layer comprising ethylene vinyl acetate; a gas barrier layer comprising polyvinylidene chloride; a second tie layer comprising ethylene vinyl acetate; and a sealant layer comprising a metallocene catalyzed linear low density polyethylene or ultra low density polyethylene.

As shown in the FIGURE, a five layer film (10) comprises: an abuse layer (12), a first tie layer (14), a gas barrier layer (16), a second tie layer (18), and a sealant layer (20).

The abuse layer (12) may be a styrene-butadiene block copolymer (SBC) prepared from styrene and butadiene. The SBC may have a styrene content of between about 70% to about 85% of the total weight of the copolymer. In one embodiment, the polystyrene is about 75 wt % of the total weight of the copolymer. This sealant layer may replace typical LLDPE/EVA or LLDPE/LDPE of prior films.

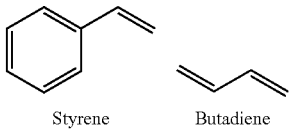

Styrene   Butadiene

Exemplary styrene-butadiene copolymers (SBC) include those from the K-Resin family available from Chevron Philips Chemical Company LP. An abuse layer prepared with styrene-butadiene block copolymer may improve the printability, clarity, and gloss of the shrink film.

The abuse layer (12) may be adhered to the gas barrier layer (16) through first tie layer (14). The first tie layer may include EVA. As used herein, the phrase "ethylene vinyl acetate" or EVA, refers to a copolymer formed from ethylene and vinyl acetate monomers, as shown below. The acetate may be O⁻ (salt) or O—R (ester).

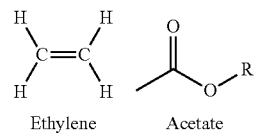

Ethylene   Acetate

The ethylene derived units in the copolymer may be present in major amounts, such as between about 60 to about 98 percent, while the vinyl acetate derived units in the copolymer may be present in minor amounts, such as between about 2 and about 40 percent.

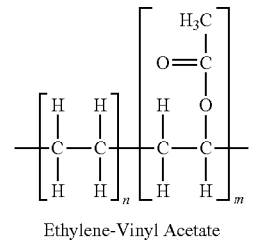

Ethylene-Vinyl Acetate

The density of the EVA layer may be about 0.92 g/cm³ to about 0.98 g/cm³. In one embodiment, the density is about 0.942 g/cm³.

A gas barrier layer (16) may be a middle or core layer. The gas barrier layer includes polyvinylidene chloride.

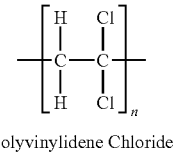

Polyvinylidene Chloride

The gas barrier layer (16) may be adhered to the sealant layer (20) through a second tie layer (18). The second tie layer may be EVA, as discussed above. The density of the EVA layer may be between about 0.92 g/cm³ to about 0.98 g/cm³. In one embodiment, the density is about 0.942 g/cm³.

The sealant layer (20) may be the layer that contacts the product. The sealant layer may comprise a metallocene catalyzed linear low density polyethylene (LLDPE) or ultra low (ULDPE). Linear low density refers to density values at or below 0.930 g/cm³, such as between 0.915 g/cm³ to 0.930 g/cm³. Ultra low density refers to density values at or below 0.915 g/cm³, such as between 0.86 and 0.915 g/cm³. The sealant layer does not comprise medium density polyethylene (MDPE) or high density polyethylene (HDPE).

As is within the skill of the art, various monomers may be used to produce the polyethylene including comonomers of butane and octane.

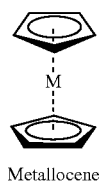

Metallocene

An example of a commercial metallocene catalyzed sealant layer which may be used is ExxonMobil Exact 0203.

In one embodiment, a five layer film includes an abuse layer which comprises about 11% to about 12% of the total film thickness; the first tie layer (adjacent the abuse layer) comprises about 10% to about 15% of the total film thickness; the gas barrier layer comprises about 10% to about 15% of the total film thickness; the second tie layer (adjacent the sealant layer) comprises about 35% to about 55% of the total film thickness; and the sealant layer comprises about 10% to about 15% of the total film thickness.

In one embodiment of the present disclosure, the abuse layer is about 12 wt %; the first tie layer is about 14 wt %; the gas barrier layer is about 9 wt %; the second tie layer is about 54 wt %; and the sealant layer is about 11 wt %; all % based on total film weight of a five layer film.

One or more film additives may be added to one or more of the layers, such as slip agents, antiblocking agents, colorants, odor inhibitors, or oxygen inhibitors. For example, the antiblocking agent SKR17 from Chevron Phillips Chemical may be used in about 3% to about 4% by weight of the film. Slip/antiblock agents such as ABPS 120428 and ABPS 120429 from PolyOne may also be used.

The oxygen transmission rate of the multilayer film may be between about 10 $cc/m^2/atm/day$ at 0% and 75% relative humidity at 23° C., to about 30 $cc/m^2/atm/day$ at 0% and 75% relative humidity at 23° C., and may be less than about 20 $cc/m^2/atm/day$ at 0% and 75% relative humidity at 23° C. The oxygen transmission rate may be generally determined by the gas barrier layer.

The multilayer film may be oriented 1.5 to 3.0× in the machine direction and 3 to 5× in the cross direction. In one embodiment, the film is oriented 2.5× in the machine direction and 4× in the cross direction.

The thickness of the multilayer film may be between about 45 microns and about 55 microns, or between about 1.77 mil and about 2.17 mil. In one embodiment, the film is about 51 microns thick (about 2.0 mil).

As used herein, the phrase "heat shrinkable", "heat shrink" and the like, refer to the tendency of a film, especially an oriented film, to shrink upon the application of heat. Low temperature heat shrink films shrink at a temperature of less than about 90° C., such as 80° C. to 90° C. An average maximum cross-directional shrinkage may be greater than 0%, such as at least above 0 to about 60%. For example, a film may have a shrink percentage in the range of 45-65% TD and 40-60% MD at 87° C.

The impact strength of the multilayer film, tested with 0.25 inch radius probe, may be less than about 40 pounds. In one embodiment, the tear strength is about 217 in the machine direction and 289 in the cross direction (in grams), using an unnotched tear strength test with a 3200 gm pendulum.

The film may be prepared in any suitable manner, such as by co-extrusion or blown film extrusion of the various layers. Such techniques are known by a skilled artisan for the production of films.

The film may be irradiated to cross-link the tie and gas barrier layers in accordance with processes known in the art.

The film provides good printability, clarity, and gloss characteristics. For example, the gloss may be in the range of 85-95% at 45° C., with a haze below 10% and a clarity value of over 85%. The film may be printed with conventional methods such as flexography or rotogravure.

The low temperature shrink films may, for example, be used as rollstock or end-sealed or side-sealed bags (curved, straight, or combinations thereof).

It will be understood by those having skill in the art that changes may be made to the details of the above-described embodiments without departing from the underlying principles presented herein. For example, any suitable combination of various embodiments, or the features thereof, is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, FIGURE, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

The claims following this Detailed Description are hereby expressly incorporated into this Detailed Description, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Embodiments of the invention in which an exclusive property or privilege is claimed are defined as follows.

The invention claimed is:
1. A multi-layer film consisting of:
   an abuse layer defining a first outer layer of the film, the abuse layer comprising styrene-butadiene block copolymer;
   a first tie layer comprising ethylene vinyl acetate;
   a gas barrier layer comprising polyvinylidene chloride;
   a second tie layer comprising ethylene vinyl acetate; and
   a sealant layer defining a second outer layer of the film, the sealant layer comprising a metallocene-catalyzed polymer, wherein the metallocene-catalyzed polymer is at least one of linear low density polyethylene or ultra low density polyethylene.

2. The film of claim 1, wherein the thickness of the abuse layer comprises about 11% to about 12% of total film thickness.

3. The film of claim 2, wherein the thickness of the first tie layer comprises about 5% to about 15%, the thickness of the gas barrier layer comprises about 5% to about 15%, the thickness of the second tie layer comprises about 35% to about 55%, and the thickness of the sealant layer comprises about 5% to about 15%, each based on the total film thickness.

4. The film of claim 3, wherein the abuse layer is about 12%, the first tie layer is about 14%, the gas barrier layer is about 9%, the second tie layer is about 54%, and the sealant layer is about 11%, based on total film thickness.

5. The film of claim 1, wherein the film has a total thickness of about 1.5 mils to about 2.5 mils.

6. The film of claim 1, wherein the styrene-butadiene block copolymer comprises about 75 wt % polystyrene based on the total weight of the polystyrene and butadiene.

7. The film of claim 1, wherein the first tie layer and the second tie layer, independently, have a density of between about 0.92 $g/cm^3$ and about 0.98 $g/cm^3$.

8. The film of claim 7, wherein the density of each tie layer is about 0.942 $g/cm^3$.

9. The film of claim 1, wherein the metallocene-catalyzed polymer is metallocene-catalyzed linear low density polyethylene.

* * * * *